(12) United States Patent
Lendway, IV et al.

(10) Patent No.: US 8,881,357 B2
(45) Date of Patent: Nov. 11, 2014

(54) TOOL FOR PEELING APART A WELD SAMPLE

(75) Inventors: Joseph M. Lendway, IV, Dryden, MI (US); Gregory J. Zywicki, Milford, MI (US); Mark D. Gugel, Rochester Hills, MI (US); Mark T. Hall, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 511 days.

(21) Appl. No.: 13/284,452

(22) Filed: Oct. 28, 2011

(65) Prior Publication Data

US 2013/0104358 A1    May 2, 2013

(51) Int. Cl.
*B25B 27/14*   (2006.01)
*B23K 31/12*   (2006.01)
*B23K 11/11*   (2006.01)

(52) U.S. Cl.
CPC ........... *B23K 11/115* (2013.01); *B23K 2201/18* (2013.01); *B23K 31/125* (2013.01)
USPC ............................................. 29/239; 29/270

(58) Field of Classification Search
USPC .............. 20/239, 238, 244–282; 269/3, 6, 95
See application file for complete search history.

(56) References Cited

U.S. PATENT DOCUMENTS

| | | | | |
|---|---|---|---|---|
| 3,727,490 A | * | 4/1973 | Diffenderfer et al. | 81/485 |
| 4,578,851 A | * | 4/1986 | Song | 29/235 |
| 8,342,482 B2 | * | 1/2013 | Smith | 254/25 |
| 2004/0107558 A1 | * | 6/2004 | Forsberg et al. | 29/450 |
| 2013/0104358 A1 | * | 5/2013 | Lendway et al. | 29/239 |

* cited by examiner

*Primary Examiner* — Lee D Wilson

(57) ABSTRACT

A tool peels apart a sample weld between a top sheet and a bottom sheet of metal while the bottom sheet is held in a vise. The tool includes a wheel having a peripheral rim surface. A handle is attached to the wheel so that rotating the handle rotates the wheel. A clamping mechanism is mounted on the wheel and moves between an open position spaced from the peripheral rim surface and a closed position in which the clamping mechanism clamps the top sheet to the peripheral rim surface so that rotation of the wheel by the handle will progressively wrap the top sheet about the peripheral rim of the wheel and thereby forcibly peel the top sheet away from the bottom sheet to pull apart the weld between the top and bottom sheets.

14 Claims, 2 Drawing Sheets

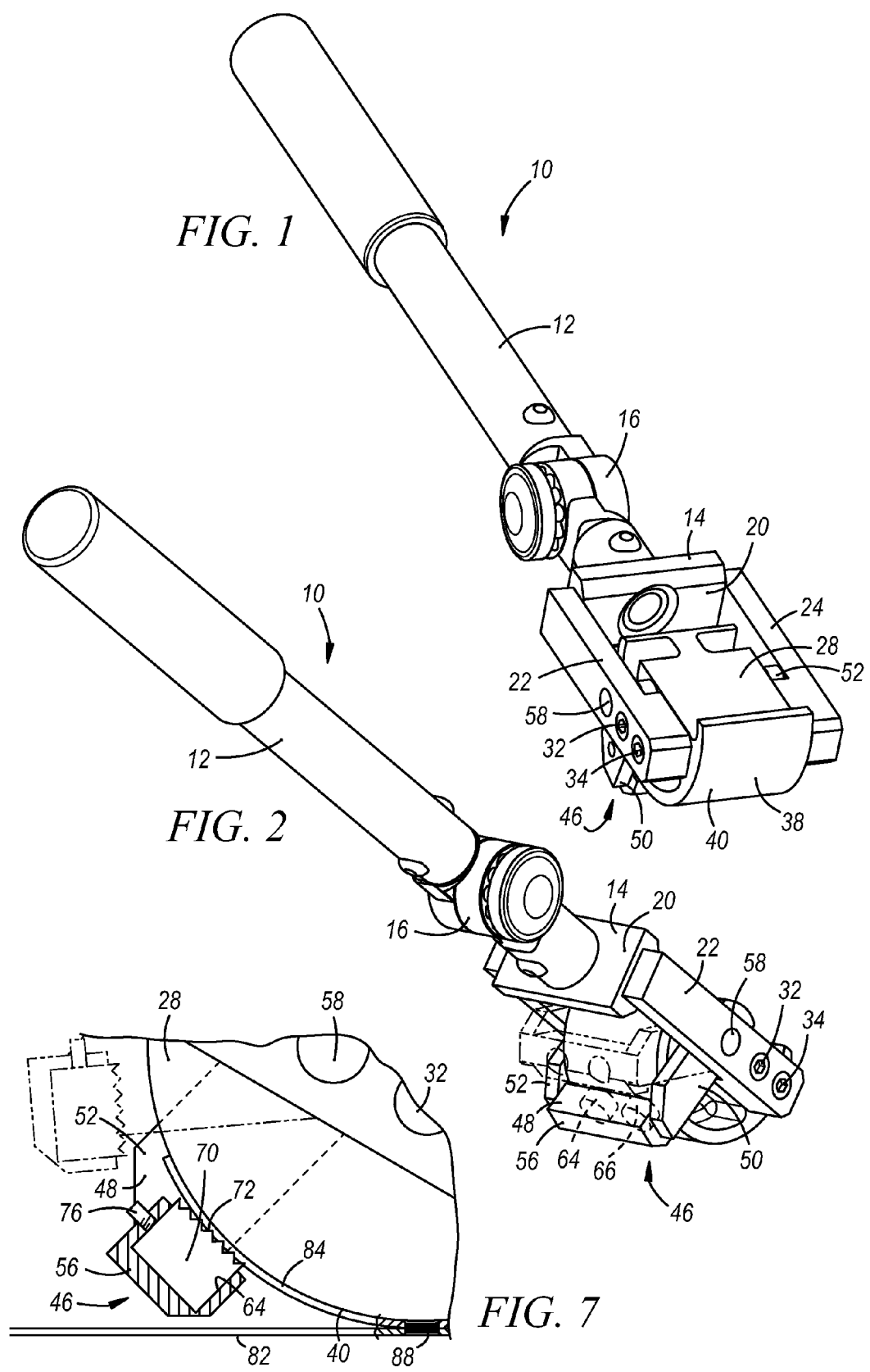

TOOL FOR PEELING APART A WELD SAMPLE

FIELD OF THE INVENTION

The present invention relates to the destructive testing of a spot weld between two metal sheets and more particularly provides a tool for effectively peeling apart the welded metal sheets.

BACKGROUND OF THE INVENTION

The attachment together of metal sheets by making a spot weld between the metal sheets is well known and widely used in the manufacturing industries. The spot weld is typically made by positioning the metal sheets against one another and then applying a pair of electrodes to press the sheets tightly together. Weld current is passed between electrodes to melt the metal and thereby create a weld nugget between the metal sheets. In general, the tenacity of the spot weld is proportional to the diameter of the weld nugget.

A common method for testing and examining a sample spot weld is to forcibly peel the metal sheets away from one another and then measure the diameter of either the weld nugget of the hole that is formed when the nugget tears away from one the sheets. The peeling apart of the metal sheets is typically performed by gripping the bottom sheet in a vice and then using a pair of handheld nipper pliers to grip the top sheet. The nipper pliers must be manually squeezed together by the operator in order to maintain an effective grip on the top metal sheet while the nipper pliers are rotated to peel the top sheet away from the bottom sheet.

It would be desirable to provide a new and improved tool for accomplishing the peeling apart of a weld sample between two metal sheets.

SUMMARY OF THE INVENTION

A tool peels apart a sample weld between a top sheet and a bottom sheet of metal while the bottom sheet is held in a vise. The tool includes a wheel having a peripheral rim surface. A handle is attached to the wheel so that rotating the handle rotates the wheel. A clamping mechanism is mounted on the wheel and moves between an open position spaced from the peripheral rim surface and a closed position in which the clamping mechanism clamps the top sheet to the peripheral rim surface so that rotation of the wheel by the handle will progressively wrap the top sheet about the peripheral rim of the wheel and thereby forcibly peel the top sheet away from the bottom sheet to pull apart the weld between the top and bottom sheets.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 1 is a perspective view showing a tool for peeling apart a weld sample.

FIG. 2 is another perspective view of the tool of FIG. 1

FIG. 7 is an enlarged fragmentary view of the tool showing removable and replaceable serrated inserts.

DETAILED DESCRIPTION OF THE EXEMPLARY EMBODIMENTS

Figure 3:
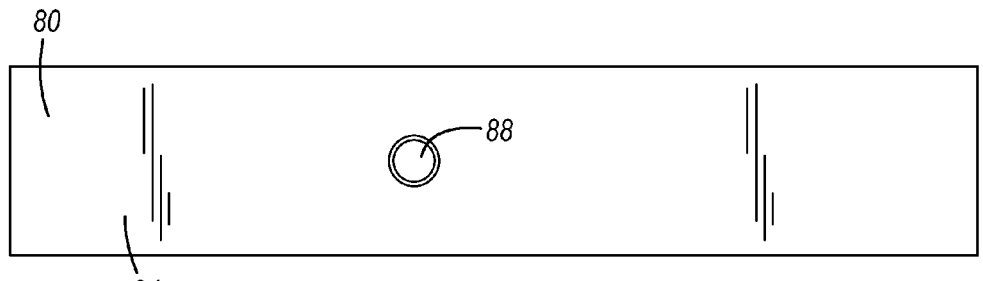
FIG. 3 is a plan view of a typical weld sample.

The following description of certain exemplary embodiments is merely exemplary in nature and is not intended to limit the invention, its application, or uses.

Referring to FIG. 1, a tool generally indicated at 10 includes a handle 12 attached to a yoke 14 by an adjustable joint 16. The adjustable joint 16 can be loosened to adjust the angle of inclination between the yoke 14 and the handle 12.

The yoke 14 includes a spreader 20 and laterally spaced apart arms 22 and 24. A wheel 28 is positioned between the arms 22 and 24 and attached thereto by a pair of hex screws 32 and 34 so that the wheel 28 is fixed to the yoke 14 for unitary rotation therewith. The wheel 28 has a peripheral rim 38 having a rim surface 40. The wheel 28 can be a half wheel shape as shown in the drawings, or, alternatively the wheel 28 can be a full round wheel. The rim surface 40 can be of a constant radius or the rim surface can have a varying radius so that the rim surface will have an elliptical or other curving surface rather than a strict circular shape.

Figure 4:
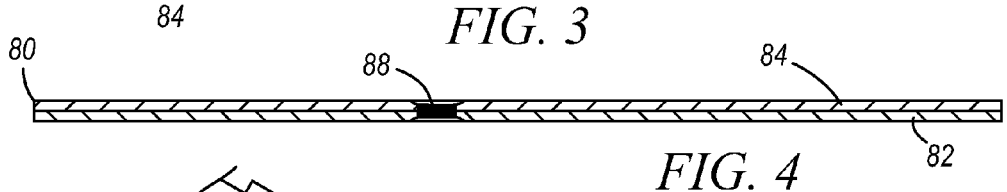
FIG. 4 is a side view of the weld sample of FIG. 3 and shows a top metal sheet and a bottom metal sheet that joined together by a spot weld nugget.
Figure 5:
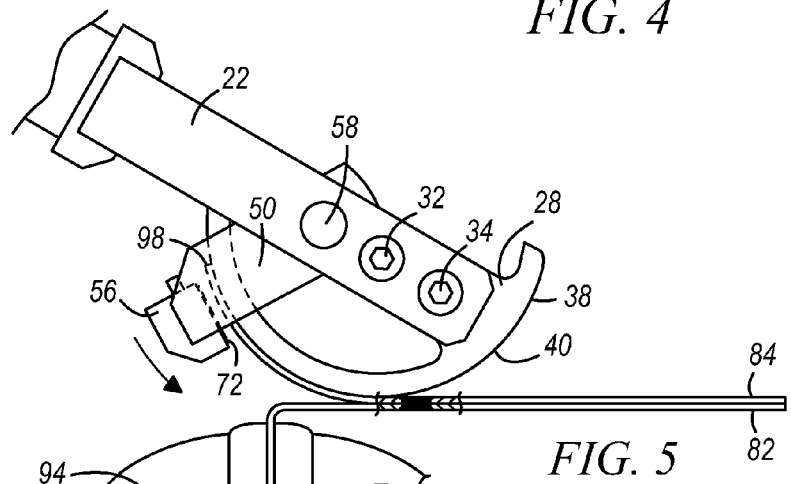
FIG. 5 shows the tool of FIGS. 1 and 2 applied to the weld sample of FIGS. 3 and 4.

A clamping mechanism, generally indicated at 46, is movably mounted on the wheel 28 and yoke 14. As seen in FIGS. 1, 2, 5 and 7 the clamping mechanism 46 includes a U-shaped clamp frame 48 that includes legs 50 and 52 and a clamp base 56. The legs 50 and 52 straddle the sides of the wheel 28 and an are pivotally mounted on the arms 22 and 24 of yoke 14 by a pivot pin 58. In FIG. 5 the wheel 28 is circular, and the peripheral rim 38 is at a constant radius from a center 60 of the wheel. The center of the pivot pin 58 is located at a distance away from the center 60 of the wheel 28. The pivot pin 58 permits movement of the clamping mechanism 46 between an open position, shown in FIG. 5, and a closed position shown in FIG. 6. As seen in FIG. 7, the clamp base 56 has receptacles 64 and 66 that respectively receive cylindrical inserts 70. As seen in FIG. 7, each of which has a serrated gripping face 72. The cylindrical inserts 70 can be removed and replaced and are held in place by set screws 76. FIGS. 3 and 4 show a typical weld sample 80 that is to be peeled apart so that the tenacity of the spot weld can be examined. In particular, the sample 80 includes a bottom metal sheet 82 and a top metal sheet 84 that have been welded together so that the metal sheets 82 and 84 are attached together by weld nugget 88.

Referring to FIG. 5, the weld sample 80 is shown mounted in a vise assembly, generally indicated at 90. Vise 90 includes a fixed jaw 92 and a movable jaw 94. The end 96 of the bottom sheet 82 has been bent downwardly and is gripped between the jaws 92 and 94. In addition, FIG. 5 shows that the end 98 of the top sheet 84 has been bent upwardly somewhat from the bottom sheet 82 so as to become accessible for gripping by the tool 10. If desired, the sample 80 can be manufactured with the top sheet 84 being somewhat longer than the bottom sheet 82 to facilitate the gripping of the top sheet 84.

In FIG. 5, the tool 10 has been applied to the test sample 80. In particular, it is seen that the rim surface 40 of the wheel 28 is rested upon the top sheet 84 and the top sheet 84 is positioned between the rim surface 40 and the clamp base 56 of the clamping mechanism 46. After applying the tool 10 to the test sample 80 is shown in FIG. 5, the clamping mechanism 46 can be pivoted from its open position of FIG. 5 to its closed position of FIG. 6 by rotating the clamping mechanism 46 counterclockwise. Because the center of the pivot pin 58 is located at a distance from the center 60 of the wheel 28, as the clamping mechanism 46 rotates from the position of FIG. 5 to the position of FIG. 6, the serrated gripping face 72 will be carried closer to the rim surface 40 so that the top sheet 84 will be clamped against the rim surface 40.

Figure 6:
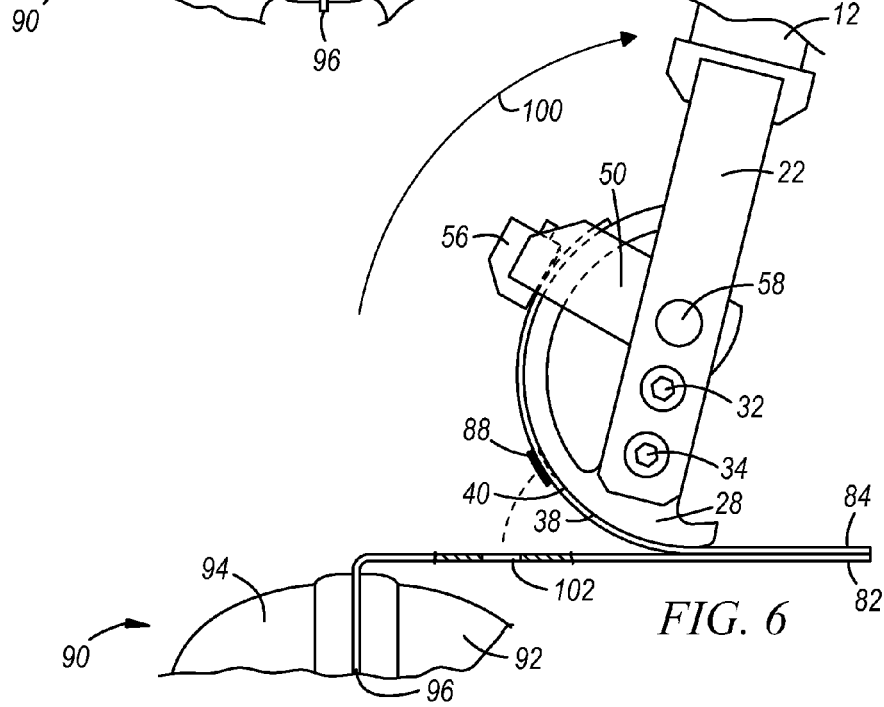
FIG. 6 shows the operation of the tool to peel apart the spot weld between the top sheet and the bottom sheet.

FIG. 6 also shows that the operator has rotated the handle 12 clockwise in the direction of arrow 100 which in turn causes the wheel 28 to rotate. The top plate 84, which is clamped to the rim surface 40 of the wheel 28 by the clamping mechanism 46, has been progressively rolled up and lifted away from the bottom metal sheet 82 that is held in the vise 90. Accordingly, as seen in FIG. 6, the welded attachment between the bottom sheet 82 and top sheet 84 has been broken. As seen in FIG. 6, the weld nugget 88 has remained with the top sheet 84 and accordingly a hole 102 to has been created in the bottom sheet 82.

The diameter of the nugget 88 or the diameter of the hole 102 will be measured and examined as a means of quantifying the tenacity of the welded connection between the bottom sheet 82 and top sheet 84.

The tool 10 provides substantial leverage and mechanical advantage for the operator to peel apart the weld while the vise holds the bottom sheet 82 and the clamping mechanism 46 reliably grips the top sheet 84 against the peripheral rim surface 40. Clamping mechanism 46 can be easily released from the sample 80 by pivoting the clamping mechanism 46 back to its open position so that the top sheet 84 is released from the tool 10.

Thus it is seen that the invention has provided a new and improved tool which facilitates the peeling apart of a welded joint between welded together metal sheets. A person of ordinary skill in the art will recognize that various modifications can be made in the tool. For example, it may be desirable to have a spring acting between the clamping mechanism and the handle to rotate the clamping mechanism to a certain position about the pivot 58. For example the spring could act to bias the clamping mechanism to toward either the open position or the closed position.

What is claimed is:

1. A tool for peeling apart a weld between a top sheet and a bottom sheet of metal while the bottom sheet is held in a vise, comprising:
    a wheel having a peripheral rim surface;
    a handle attached to the wheel so that rotating the handle rotates the wheel;
    a clamping mechanism having a serrated face for gripping the top sheet, the clamping mechanism being mounted on the wheel for movement between an open position spaced from the peripheral rim surface of the wheel and a closed position in which the clamping mechanism clamps the top sheet to the peripheral rim surface so that rotation of the wheel by the handle will progressively wrap the top sheet about the peripheral rim of the wheel and thereby peel the top sheet away from the bottom sheet to pull apart the weld between the top and bottom sheets.

2. The tool of claim 1 further comprising a pivot mounting the clamping mechanism on the wheel.

3. The tool of claim 1 further comprising the serrated face being provided by one or more removable and replaceable inserts having the serrated face.

4. The tool of claim 1 further comprising the wheel having a center of rotation and the peripheral rim being at a constant radius from the center of rotation.

5. The tool of claim 1 further comprising the wheel having a center of rotation and the clamping mechanism being movably mounted on the wheel by a pivot located at a distance from the center of rotation of the wheel.

6. The tool of claim 5 further comprising the serrated face being provided by one or more removable and replaceable inserts having the serrated face.

7. The tool of claim 1 further comprising the clamping mechanism having a U-shaped clamp frame that straddles the wheel and a clamp base having a serrated face for gripping the top sheet against the peripheral rim surface, and a pivot pivoting the U-shaped clamp frame for movement toward and away from the peripheral rim.

8. The tool of claim 7 further comprising the serrated face being provided by one or more removable and replaceable inserts having the serrated face.

9. A tool for peeling apart a weld between a top sheet and a bottom sheet of metal while the bottom sheet is held in a vise, comprising:
    a circular wheel having a peripheral rim surface for lying upon the top sheet;
    a handle attached to the wheel so that rotating the handle rotates the wheel so that the wheel rolls along the top sheet;
    a clamping mechanism pivotally mounted on the wheel for movement between an open position spaced from the peripheral rim surface and a closed position in which a serrated face of the clamping mechanism engages the top sheet to clamp the top sheet to the peripheral rim surface so that rotation of the wheel by the handle will progressively wrap the top sheet about the peripheral rim of the wheel and thereby peel the top sheet away from the bottom sheet to pull apart the weld between the top and bottom sheets.

10. The tool of claim 9 further comprising the wheel having a center of rotation and the pivot mounting the clamping mechanism being located a distance from the center of rotation of the wheel so that pivoting the clamping mechanism will carry the serrated face toward and away from the peripheral rim surface.

11. The tool of claim 9 further comprising the serrated face being provided by one or more removable and replaceable inserts having the serrated face.

12. The tool of claim 9 further comprising the clamping mechanism having a U-shaped clamp frame that straddles the wheel includes a clamp base having the serrated face.

13. A tool for peeling apart a weld between a top sheet and a bottom sheet of metal while the bottom sheet is held in a vise, comprising:
    a circular wheel having a peripheral rim surface for lying upon the top sheet;
    a handle attached to the wheel so that rotating the handle rotates the wheel so that the wheel rolls along the top sheet;
    a U-shaped clamp frame having legs that straddle the wheel and a clamp base having a serrated face facing toward the peripheral rim surface;
    a pivot pin pivotally mounting the legs of the U-shaped clamp frame to the wheel so that pivoting movement of the clamp frame will carry the serrated face of the clamp base between an open position spaced from the peripheral rim surface and a closed position in which the serrated face engages the top sheet to clamp the top sheet to the peripheral rim surface so that rotation of the wheel by the handle will progressively wrap the top sheet about the peripheral rim surface of the wheel and thereby peel the top sheet away from the bottom sheet to pull apart the weld between the top and bottom sheets.

14. The tool of claim 13 further comprising the serrated face being provided by one or more removable and replaceable inserts having the serrated face.

\* \* \* \* \*